(12) United States Patent
Lee

(10) Patent No.: US 12,638,104 B2
(45) Date of Patent: May 26, 2026

(54) FASTENER POSITIONAL CONFIRMATION SYSTEM

(71) Applicant: Illinois Tool Works Inc., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 318 days.

(21) Appl. No.: 18/198,581

(22) Filed: May 17, 2023

(65) Prior Publication Data

US 2023/0383868 A1 Nov. 30, 2023

Related U.S. Application Data

(60) Provisional application No. 63/345,974, filed on May 26, 2022.

(51) Int. Cl.
F16L 3/13 (2006.01)
F16B 13/08 (2006.01)
F16L 3/237 (2006.01)

(52) U.S. Cl.
CPC ............ F16L 3/13 (2013.01); F16B 13/0875 (2013.01); F16L 3/237 (2013.01)

(58) Field of Classification Search
CPC .......... F16L 3/13; F16L 3/237; F16B 13/0875
See application file for complete search history.

(56) References Cited

U.S. PATENT DOCUMENTS 4,717,100 A 1/1988 Klein
5,291,639 A 3/1994 Baum 6,290,201 B1 9/2001 Kanie
6,371,419 B1 * 4/2002 Ohnuki ..................... F16L 3/13
248/74.2
6,450,459 B2 9/2002 Nakanishi
6,779,763 B2 8/2004 Miura
6,915,990 B2 7/2005 Maruyama
7,036,775 B2 5/2006 Nakanishi
7,059,022 B2 6/2006 Yuta
7,086,630 B2 8/2006 Maruyama
(Continued)

FOREIGN PATENT DOCUMENTS

AT 524862 A4 10/2022
CN 104534178 A 4/2015
(Continued)

OTHER PUBLICATIONS

Examination report dated Jan. 30, 2024 in German application No. 10 2023 113 335.7 (7 pages).

*Primary Examiner* — Anita M King
(74) *Attorney, Agent, or Firm* — McAndrews, Held & Malloy, Ltd.

(57) ABSTRACT

Described is a fastener for securing at least one tube relative to a component. The fastener includes a carrier portion, a fastener portion, and an installation indicator. The carrier portion is configured to secure the at least one tube via at least one tube pocket. The installation indicator positioned in or on the carrier portion via a hinge. The tab can pivot between a first position and a second position when the tube is inserted into the tube pocket to indicate that the tube is properly seated in the tube pocket. The installation indicator can be a barcode or a quick response (QR) code.

16 Claims, 9 Drawing Sheets

(56) References Cited

U.S. PATENT DOCUMENTS

| | | | |
|---|---|---|---|
| 7,887,012 B2 | 2/2011 | Desai | |
| 8,157,222 B1 * | 4/2012 | Shirey | H02G 3/32 |
| | | | 248/68.1 |
| 8,579,570 B2 | 11/2013 | Fellows | |
| 8,684,321 B2 | 4/2014 | Shirakabe | |
| 8,753,055 B2 | 6/2014 | Ruckel | |
| 8,979,461 B2 | 3/2015 | Pearson | |
| 9,109,617 B2 * | 8/2015 | Diep | F16L 3/1075 |
| 9,383,041 B2 | 7/2016 | Kanie | |
| 9,453,593 B2 | 9/2016 | Pearson | |
| 9,494,258 B2 * | 11/2016 | Flynn | F16L 3/237 |
| 10,018,214 B2 | 7/2018 | Yon | |
| 10,119,631 B2 | 11/2018 | Toll | |
| 10,385,901 B2 | 8/2019 | Steltz | |
| 10,527,202 B2 | 1/2020 | Kanie | |
| 10,723,291 B2 | 7/2020 | Leancu | |
| 11,365,840 B2 | 6/2022 | Gauthier | |
| 11,873,929 B2 * | 1/2024 | Hann | F16L 3/1041 |
| 12,140,254 B2 * | 11/2024 | Lee | F16B 21/084 |
| 2019/0040982 A1 | 2/2019 | Cantrell | |

| | | | |
|---|---|---|---|
| 2023/0349407 A1 | 11/2023 | Lepper | |
| 2023/0383868 A1 | 11/2023 | Lee | |
| 2023/0417265 A1 | 12/2023 | Benoit | |

FOREIGN PATENT DOCUMENTS

| | | | |
|---|---|---|---|
| DE | 4123430 C1 | 6/1992 | |
| DE | 10230747 B3 | 4/2004 | |
| DE | 102005056777 B3 | 11/2006 | |
| DE | 102006013899 B3 | 11/2006 | |
| DE | 102009011864 A1 | 9/2010 | |
| DE | 102012012574 A1 | 10/2013 | |
| DE | 102015016710 B3 | 1/2017 | |
| DE | 102018219440 A1 | 5/2020 | |
| DE | 202020103903 U1 | 7/2020 | |
| EP | 1445845 A2 | 8/2004 | |
| EP | 3573205 A1 | 11/2019 | |
| EP | 3943795 A1 | 1/2022 | |
| EP | 4060217 A1 | 9/2022 | |
| FR | 3010465 | 3/2015 | |
| FR | 3131761 A1 | 7/2023 | |

* cited by examiner

FASTENER POSITIONAL CONFIRMATION SYSTEM

RELATED APPLICATION

The present application claims priority to U.S. Provisional Patent Application No. 63/345,974, filed May 26, 2022, which is hereby incorporated by reference in its entirety.

BACKGROUND

Automotive components require fastening techniques that are simple to manufacture and assemble. Further, fastening techniques should above all be reliable and efficient. In some instances, objects need to be secured to the vehicle to mitigate movement and/or shifting during operation, which can result in damage or kinking to the object. For example, tube, hoses, wires, and other objects are often secured to the vehicle components via fasteners. When a fastener is installed incorrectly such that the fastener is not fully inserted into the opening, the fastener can detach and/or the object being fastened can become damaged or loose. Similarly, when an object is attached incorrectly to a fastener, the object can detach from the fastener or become damaged or loose.

Therefore, it would be desirable to provide an installation indicator to enhance proper installation of the object relative to the fastener and/or the fastener relative to the component during assembly.

SUMMARY

The present disclosure relates generally to a fastening system to form a connection between the components, such as tubes and a component. More specifically, a fastener with an installation indicator to enhance proper installation of the object relative to the fastener and/or the fastener relative to the component during assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 3a illustrates a topside isometric view of the fastener of FIGS. 1a through 1d, while

Figure 3A:
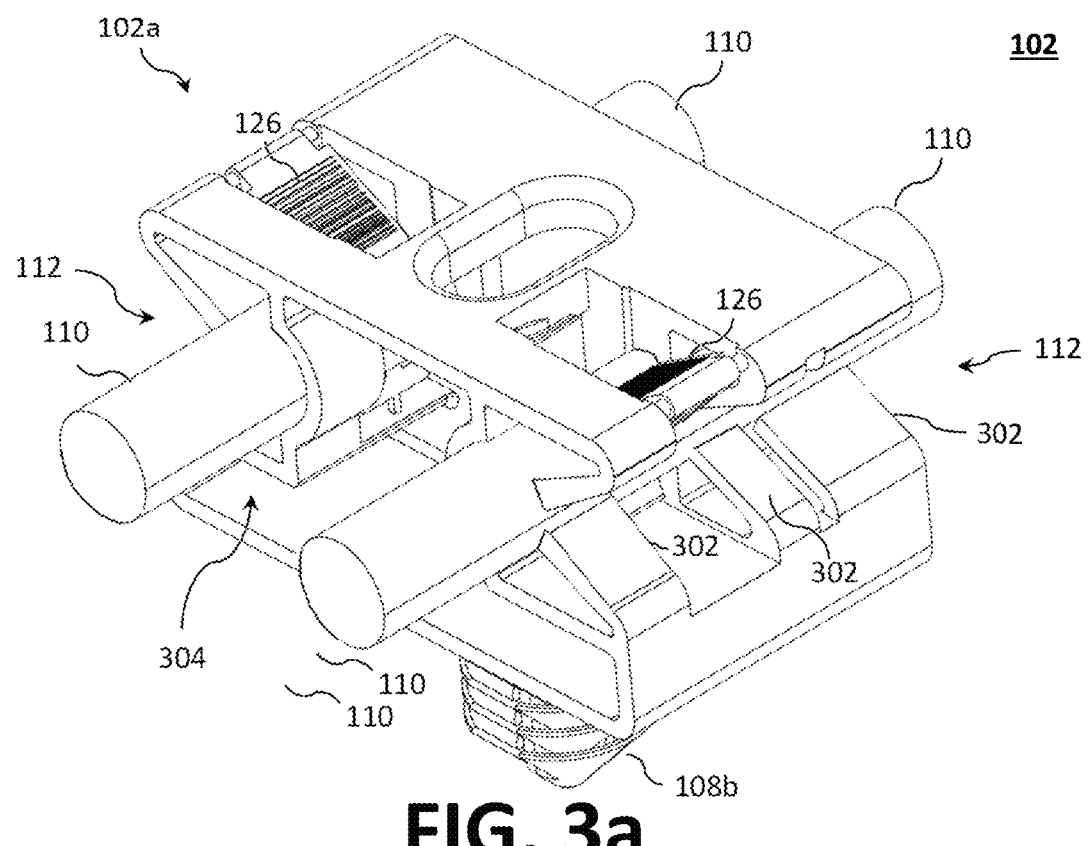
Figure 3B:
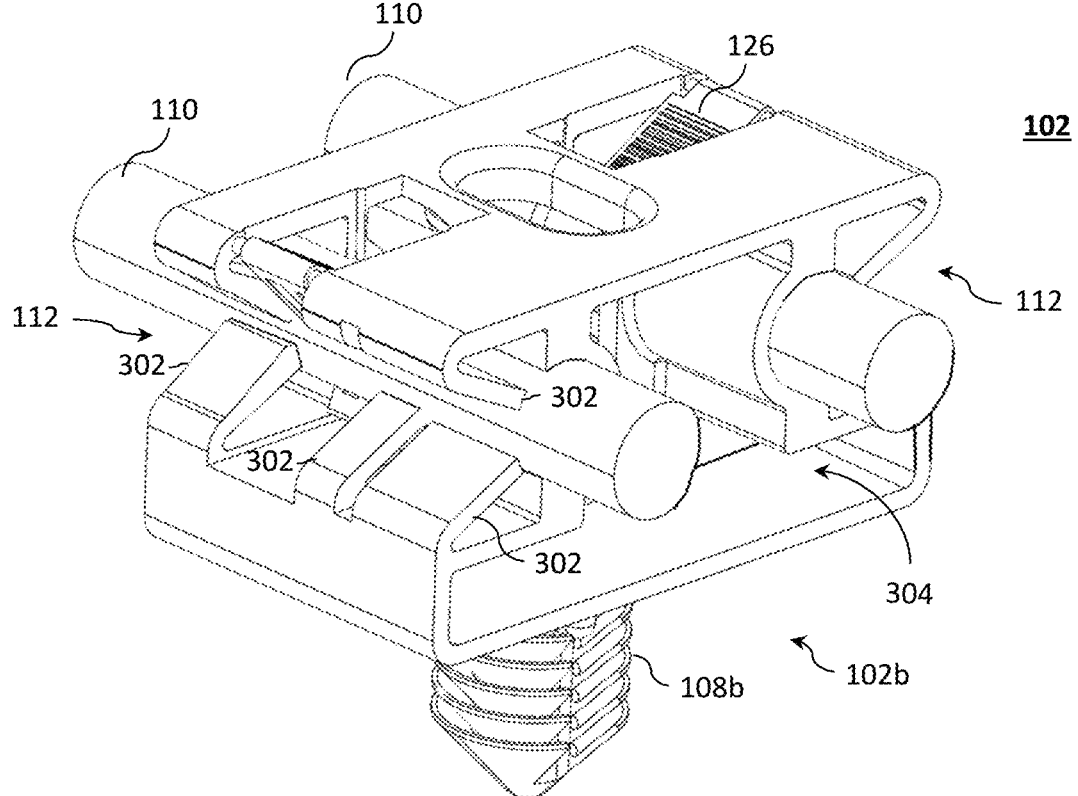
FIG. 3b illustrates an underside isometric view thereof.
Figure 3C:
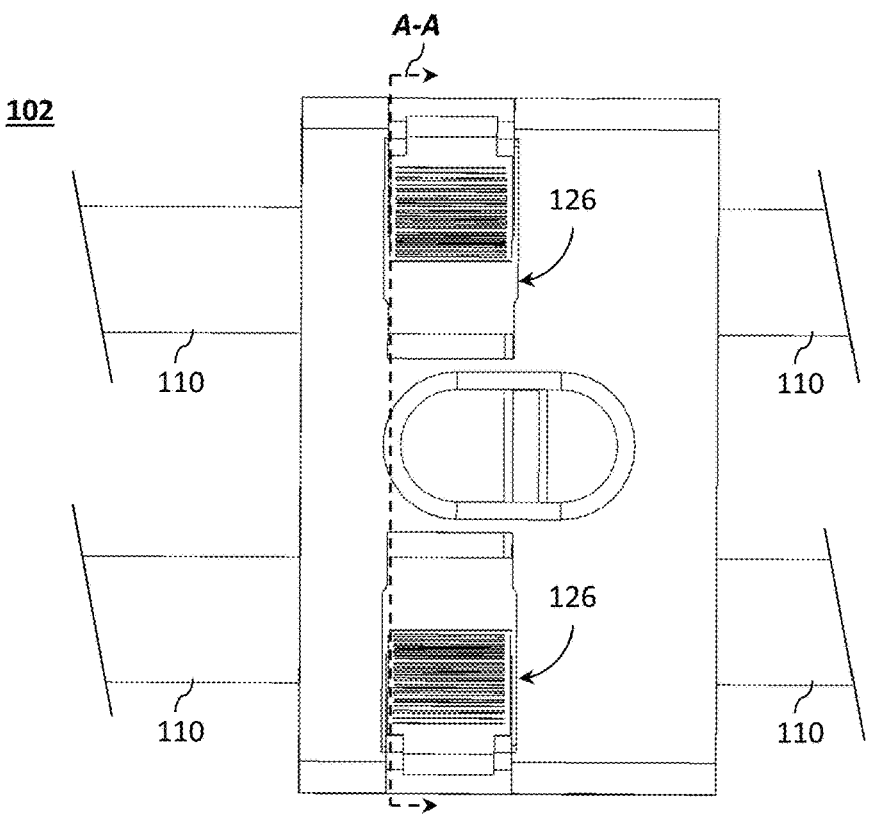
FIGS. 3c and 3d illustrate, respectively, top plan and bottom plan views of the fastener.
Figure 3D:
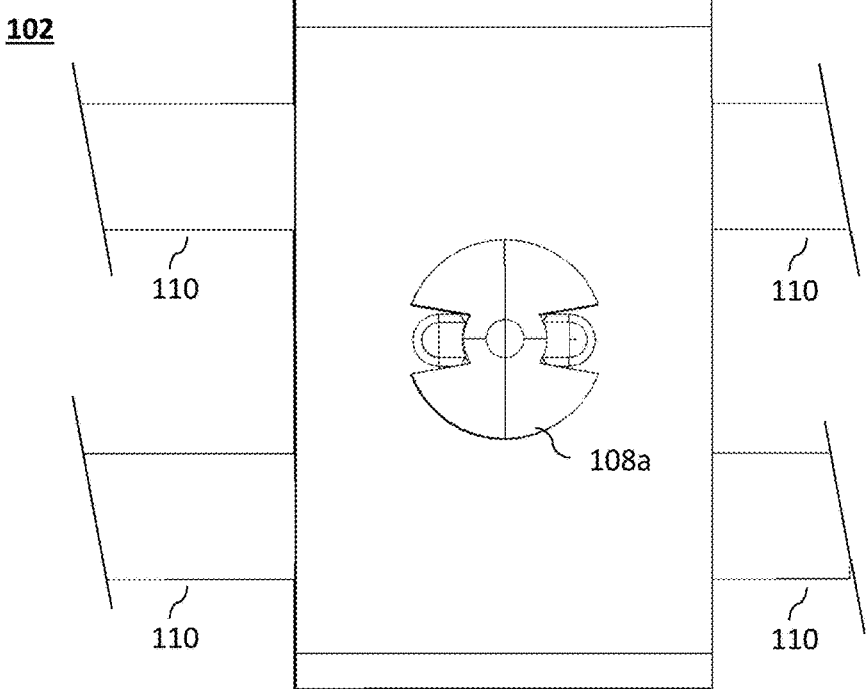
Figure 3E:
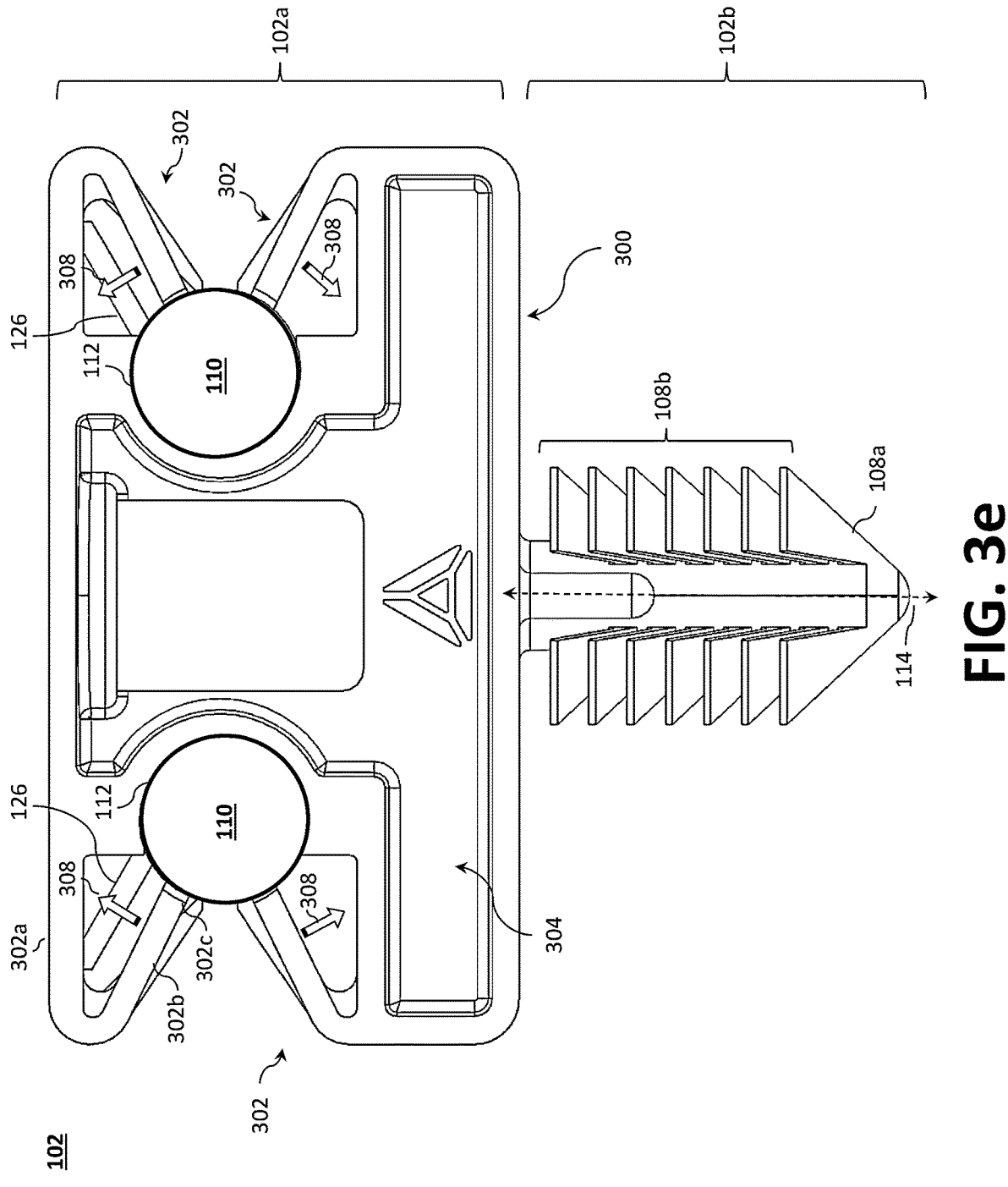
FIGS. 3e and 3f illustrate, respectively, front and side elevation views of the fastener.
Figure 3F:
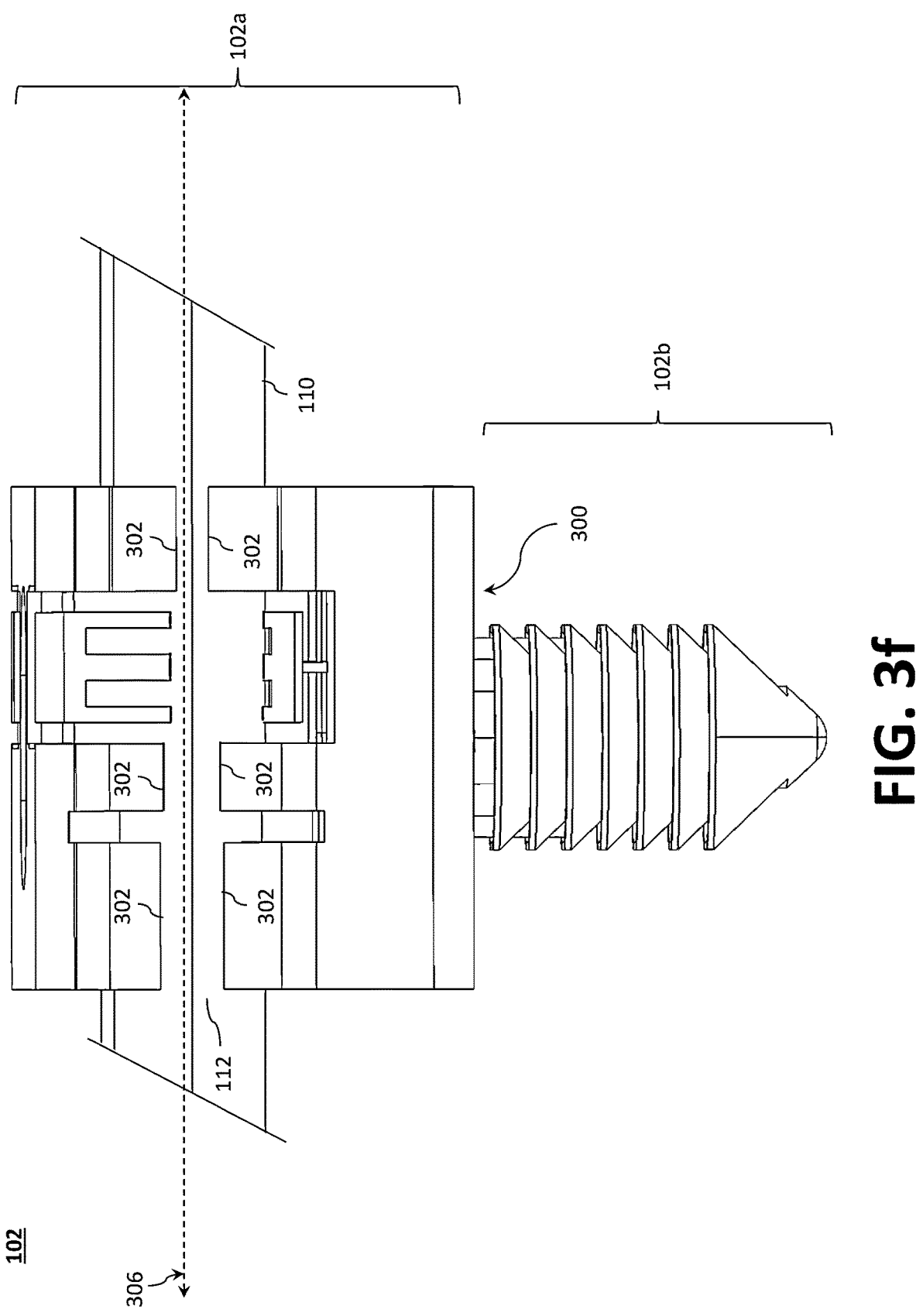
Figure 3G:
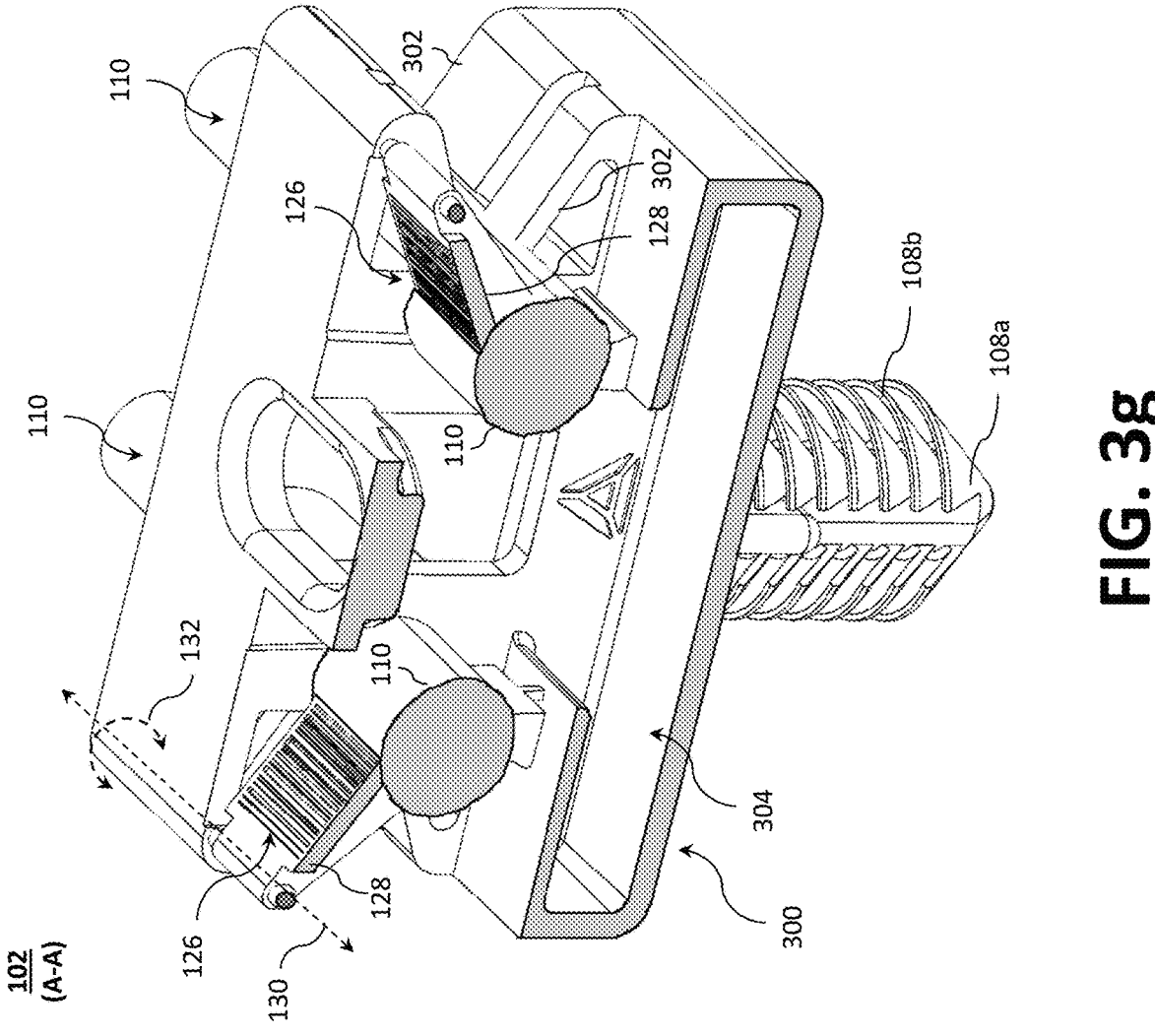

FIG. 3g illustrated a topside isometric view of the fastener taken along cut line A-A.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A fastener can be used to couple an object to a component, such as a tube to an automotive component. In one example, a fastener for securing at least one object (e.g., a tube) relative to a component comprises a carrier portion, a fastener portion, and an installation indicator. The carrier portion is configured to secure the at least one object, while the fastener portion defining a central longitudinal axis and is configured to engage the component. The installation indicator is positioned in or on the carrier portion. In some examples, the carrier portion and the fastener portion are fabricated as a unitary structure via a plastic-injection molding process or an additive manufacturing process.

In another example, a fastening system comprises a fastener, an installation indicator, and a reader. The fastener includes a tube pocket configured to retain a tube. The installation indicator positioned in or on the fastener. The reader separate from the fastener and operatively coupled to a computer, the reader configured, via a processor, to track the installation indicator during installation of the tube or the fastener.

In yet another example, a fastener for securing at least one tube relative to a component comprises a carrier portion, a fastener portion, and an installation indicator. The carrier portion is configured to secure the at least one tube via at least one tube pocket. The fastener portion defines a central longitudinal axis and is configured to engage the component via an opening. The installation indicator positioned in or on the carrier portion.

In some examples, the installation indicator is coupled to a tab, which, in turn, can be coupled to the carrier portion via a hinge. The tab is configured to pivot between a first position and a second position when the object is inserted into the carrier portion. For example, the tab assumes the second position when the object is properly seated into the carrier portion. In some examples, the tab includes a 2-dimensional installation indicator, such as a barcode or a quick response (QR) code. In another example, the tab includes a 3-dimensional installation indicator. In some examples, the at least one retention finger comprises an arm and one or more wings. In some examples, each of the one or more wings is resiliently connected to the arm and configured to deflect as the at least one object is passed into the at least one tube pocket. The one or more wings comprises a foot positioned at a distal end thereof.

Figures 1A, 1B:
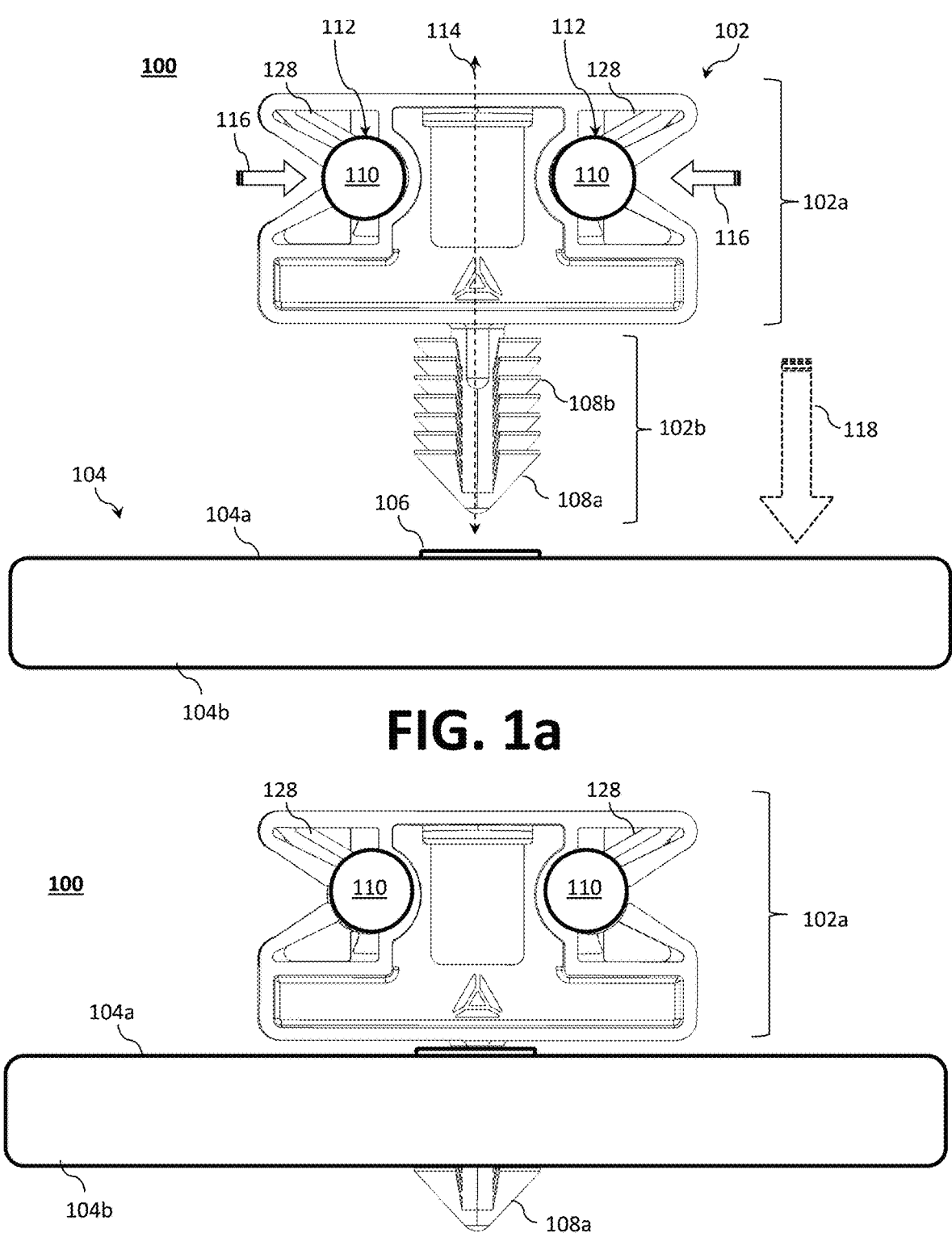
FIGS. 1a through 1d illustrate a fastening system configured to secure one or more tubes relative to a component via a fastener in accordance with aspects of this disclosure.
Figure 1C:
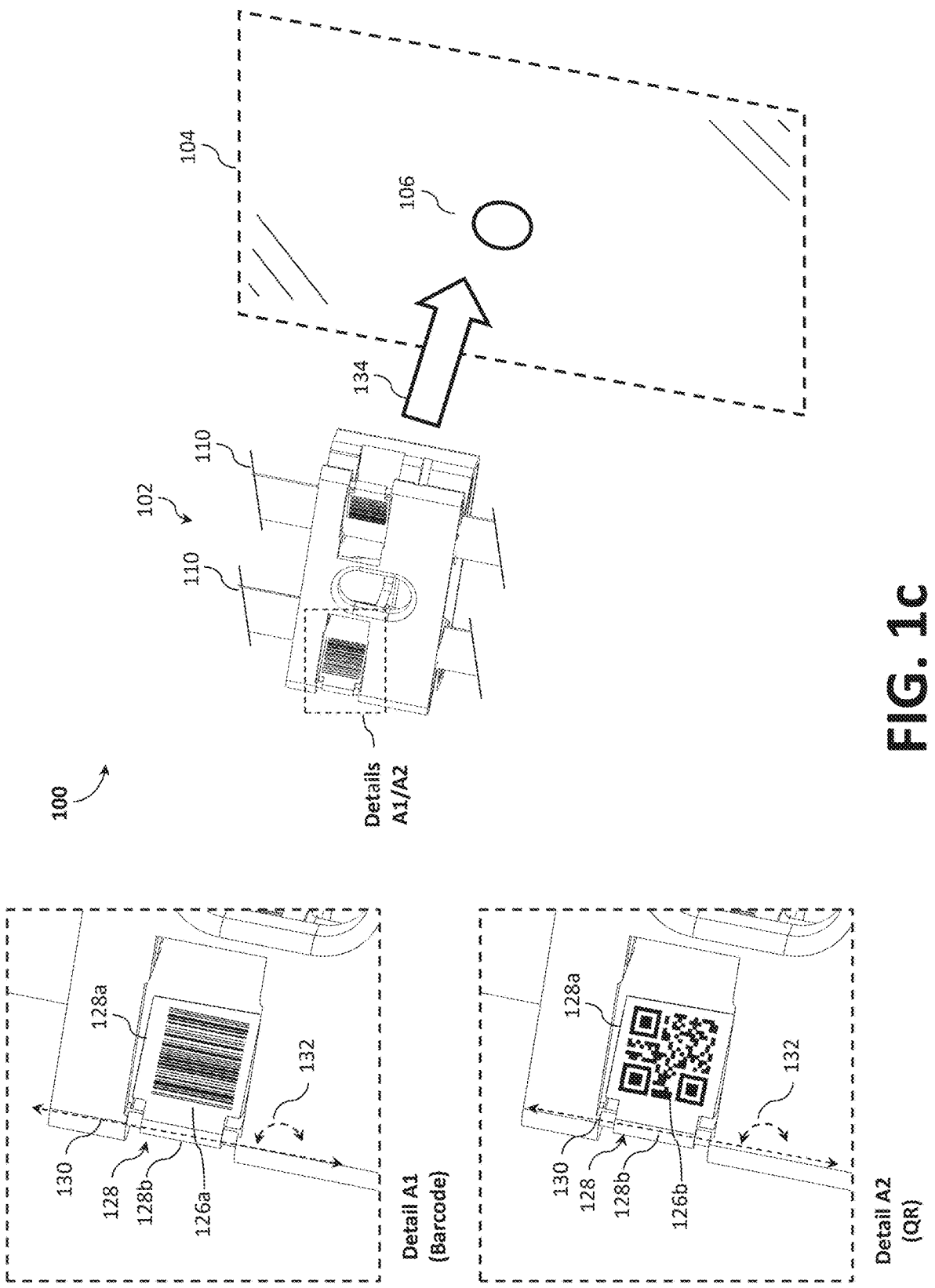
Figure 1D:
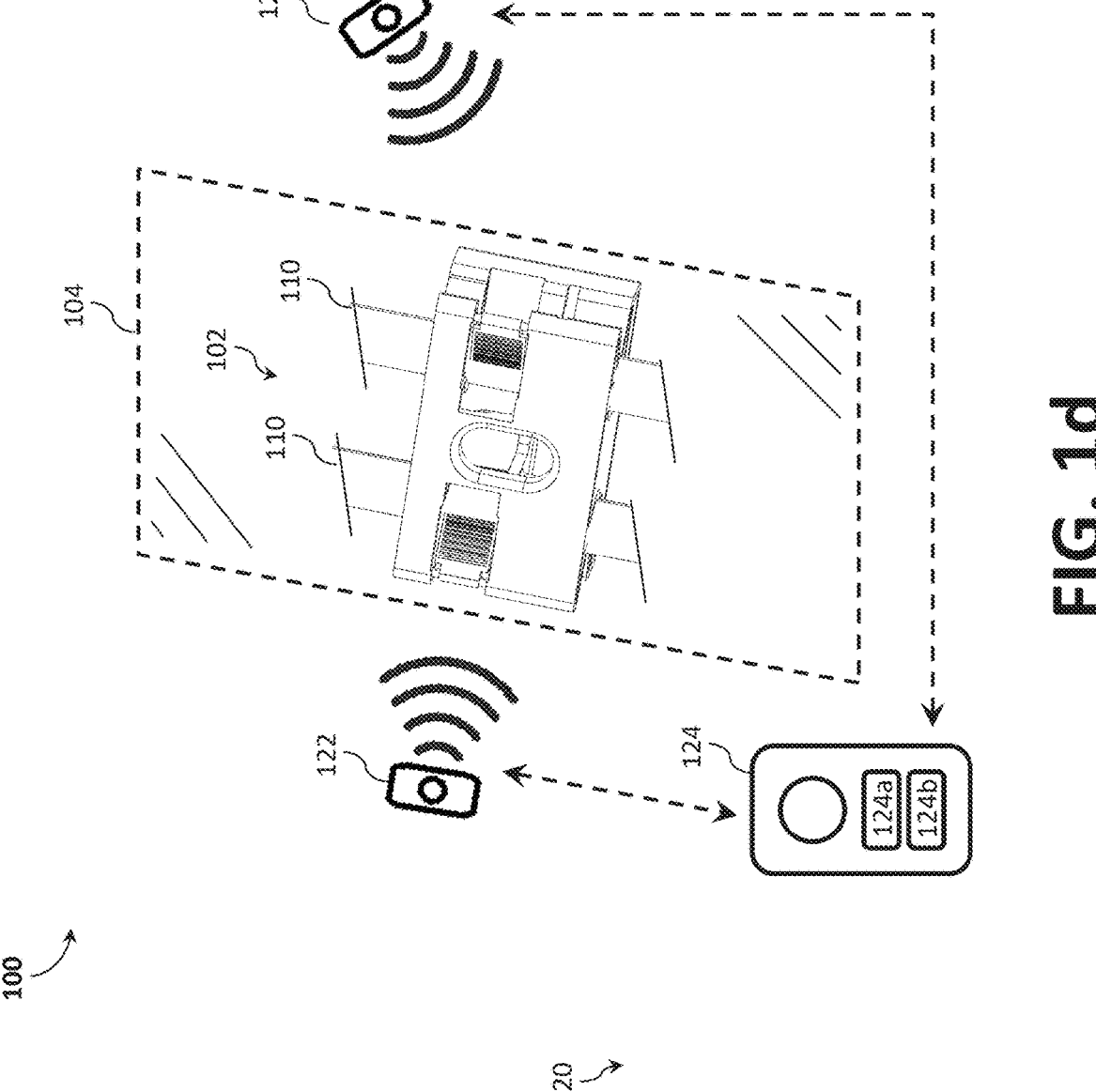

FIGS. 1a and 1b illustrate side views of an example fastening system 100 configured to secure one or more tubes 110 relative to a component 104 via a fastener 102. FIGS. 1c and 1d illustrate, respectively, isometric views of an example fastening system 100 before and after assembly in accordance with an aspect of this disclosure. The illustrated fastening system 100 generally comprises a fastener 102 for installation in a component 104. As best illustrated in FIG. 1c, the component 104 defines an opening 106 configured to receive and retain the fastener 102 relative to a component 104 (or other structure). In the illustrated example, the fastening system 100 is used with a visual quality system 120 having a reader 122 and a computer 124.

During assembly, the fastener 102 is inserted into the opening 106 in the component 104 in the direction shown by an arrow 134. The one or more tubes 110 may be, for example, brake lines, fuel lines, cables (e.g., electric cables), pipes, and/or any other tubular structure that may be secured to a component 104. While the fastener 102 will be described primarily as a fastener configured to attach tubes 110, the fastener 102 can be used to attach other objects and components.

As illustrated, the component 104 defines an A-side surface 104a (e.g., a first surface, such as an exterior surface) and a B-side surface 104b (e.g., a second surface, such as an interior surface). The one or more tubes 110 are illustrated as being secured to the A-side surface 104a. The component 104 may be, for example, an automotive panel, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like.

Depending on the application, the component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. The component 104 may include, define, or otherwise provide an opening 106 (e.g., a hole), which may be formed during manufacturing of the component 104.

The fastener 102 may include, define, or otherwise provide a carrier portion 102a and a fastener portion 102b. The carrier portion 102a is configured to couple with and/or secure the tubes 110 (or another object) relative to one another and, ultimately, the component 104. For example, the carrier portion 102a is illustrated with a plurality of pockets 112, each of which is configured to secure a tube 110. In some examples, one or more of the plurality of pockets 112 can be shaped as a channel with an inner diameter (or wall) that generally corresponds to the outer diameter of the tube 110.

A tube 110 can be inserted into and secured within each of the plurality of pockets 112 by pushing the tube 110 toward the respective tube pocket 112 in the direction indicated by arrow 116. During assembly, the tube 110 comes in contact with one or more retention finger 302 that flex out of the path of the tube 110 and return to position to hold tube 110 in the pocket 112. The flexible nature of the retention fingers 302 can also accommodate tubes 110 of variable sizes.

While two pockets 112 are illustrated, additional or fewer pockets 112 can be provided depending on the design needs (e.g., the number of tubes 110 that need to be secured). The dimensions of the carrier portion 102a would be adjusted accordingly to accommodate the desired number of pockets 112 and/or tubes 110. Again, while described primarily as a fastener configured to attach tubes 110, the fastener 102 can be used to attach other objects and components.

The fastener portion 102b of the illustrated fastener 102 serves to couple the carrier portion 102a to the component 104. As illustrated, the fastener portion 102b is generally perpendicular to the carrier portion 102a such that a central longitudinal axis 114 runs down the center of the fastener portion 102b. The fastener portion 102b is illustrated as a push-pin assembly (sometimes called trees, pine trees, Christmas trees, etc.) that comprises a plurality of fins 108b distributed or otherwise arranged along a length of the body 108a of the fastener portion 102b.

The fins 108b may be shaped as blades, teeth, barbs, or the like. As illustrated, the fins 108b are angled away from the central longitudinal axis 114 and are configured to deflect inward toward the central longitudinal axis 114 as the fastener portion 102b is passed through the opening 106 in the component 104. The fins 108b are angled upwardly relative to the central longitudinal axis 114 (forming an acute angle between each fin 108b and the central longitudinal axis 114) to resist pullout forces. To form the connection with the component 104, the fastener portion 102b of the fastener 102 is inserted into an opening 106 formed in or on a surface of the component 104 as indicated by the arrow 118. In some examples, the fastener portion 102b can extend beyond the component 104 to exit and protrude from the B-side surface 104b as best illustrated in FIG. 1b.

The fastener portion 102b can be integrated with the carrier portion 102a or attached during assembly (e.g., via adhesives, a welding process, a mechanical coupling, or the like). In some examples, the fastener 102 may include additional features, such as ribs and wings to mitigate noise and/or rattle between the fastener 102 and the component 104. In other examples, depending on the material type, the fastener portion 102b can be omitted and carrier portion 102a may be formed on or integrated with the component 104 during manufacturing of the component 104, whether via printing (e.g., an addition manufacturing process), molding, or layup.

If a tube 110 and/or the fastener 102 is installed or otherwise positioned incorrectly, the fastener 102 could detach from the component 104 and/or the one or more tubes 110 could become misaligned or detach from the fastener 102. Similarly, when a tube 110 is attached incorrectly to a fastener 102, the tube 110 can detach from the fastener 102 or become damaged or loose. To that end, the visual quality system 120 (or a component thereof) can be positioned adjacent the fastener 102 and/or component 104 to monitor assembly of the fastener 102 with the component 104 and/or insertion of the tubes 110 into the respective pockets 112. In the illustrated example, the visual quality system 120 includes, inter alia, a reader 122 communicatively coupled to a computer 124. The reader 122 can be communicatively coupled to the computer 124 via a wired or wireless link. The reader 122 is arranged to image or otherwise track an installation indicator 126 associated with the fastener 102.

In the illustrated example, to facilitate tracking, the fastener 102 includes a tab 128 extending toward the tubes 110. The tabs 128 support and/or otherwise provide the installation indicator 126 to be used in conjunction with (e.g., tracked by) the visual quality system 120 and/or a manual visual check. The tab 128 is illustrated as a generally flat structure defining a planar surface 128a. The tab 128 includes a hinge 128b that allows the planar surface 128a to be pivoted, bent, and/or otherwise moved relative to the fastener 102 (e.g., the carrier portion 102a) about a pivot axis 130 as indicated by arrow 132. In one example, the tab 128 is configured to pivot about the pivot axis 130 between a first position (e.g., an unloaded position) and a second position (e.g., a loaded position where the tube 110 is properly seated in the pocket 112). As the tube 110 is seated in the pocket 112, the outer surface of the tube 110 contacts the tab 128 and rotates it about the pivot axis 130 as indicated by arrow 132 from the first position into the second position (or vice versa as the tube 110 is removed from the pocket 112).

When the tube 110 is properly inserted into the pocket 112, the tube 110 causes the tab 128 to pivot about the pivot axis 130 to assume a second position. When the tube 110 is inserted into the pocket 112 improperly (or another anomaly, such as the tube 110 being the wrong size), the tab 128 would assume a third position (e.g., an intermediate position between the first and the second position). In some examples, the tabs 128 are designed such that the one or more installation indicators 126 are not visible to the visual quality system 120 unless all components are fully assembled. That is, when the tubes 110 are properly seated in the pocket 112 and/or the fastener 102 is properly seated into the opening 106 of the component 104. For example, if a tube 110 is not fully inserted and/or an incorrect tube 110 (e.g., incorrect diameter) is installed, the tab 128 will not assume the second position (e.g., it will be at a different angle) and the visual quality system 120 would either not detect the installation indicators 126 or determine that the angle is incorrect. In either case, the visual quality system 120 would indicate an error or anomaly. That is, because of the diameter of the tube 110 and/or improper seating thereof, the tube 110 does not push the tab 128 adequately to assume the second position.

As will be discussed, the tab 128 and/or the installation indicator 126 may be integral with the fastener 102. The tab 128 includes or otherwise provides the installation indicator 126, which can be, for example, a 2-dimensional fiducial marker (e.g., a barcode, quick response (QR) code, AprilTag, etc.) positioned on the planar surface 128a of the tab 128. Example barcode 126a and QR code 126b fiducial markers are illustrated in Details A1 and A2 of FIG. 1c. While the tab 128 is illustrated as a generally flat structure, it is conceivable that other shapes can be used to orient the installation indicator 126 at the appropriate angle relative to the reader 122 when the component 104 is properly inserted and seated into the opening 106 of the component 104. In another example, the installation indicator 126 can be, for example, a 3-dimensional fiducial marker formed on the tab 128. In some examples, the tab 128 can also serve to secure the tube 110 in place.

If the computer 124, via one or more processors 124a coupled to a memory device 124b, determines based at least in part on the one or more installation indicators 126 that the fastener 102 is not properly mounted to the component 104 and/or that a tube 110 is attached incorrectly to the fastener 102, an alert may be communicated to the operator (e.g., via a portable communication device) and/or, if robotic assembly is employed, the robot may automatically repeat the assembly process to correct the error.

While two installation indicators 126 (each associated with a tab 128) are illustrated, additional or fewer installation indicators 126 can be employed and associated with the fastener 102 during installation thereof. For example, a tab 128 can be provided for each pocket 112 and, in some examples, more than two pockets 112 can be provided. Conversely, a single tab 128 can be provided where only a single pocket 112 is provided. Further, additional installation indicators 126 can be formed in or on the fastener 102 to provide redundancy and/or increase accuracy by having multiple positional data points. In some examples, in addition to or in lieu of the tab 128, one or more installation indicators 126 can be positioned on another portion of the carrier portion 102a (e.g., a sidewall thereof).

The fastener 102 may be formed as a unitary structure. For example, the fastener 102 can be fabricated via mold tooling and a plastic-injection molding process. In another example, the fastener 102 can be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, the fastener 102 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

Additive manufacturing techniques print objects in three dimensions, therefore both the minimum feature size (i.e., resolution) of the X-Y plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (DPI) or micrometers (μm). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). A printing process in a higher vertical resolution printing, however, will take longer to produce finer layers as the printer has to produce more layers. In some examples, the fastener 102 may be formed or otherwise fabricated at different resolutions during a printing operation. For example, the carrier portion 102a (or portions thereof) may be printed at a higher resolution than that of the fastener portion 102b or vice versa as needed for a particular application.

Figures 2A, 2B, 2C, 2D, 2E, 2F:
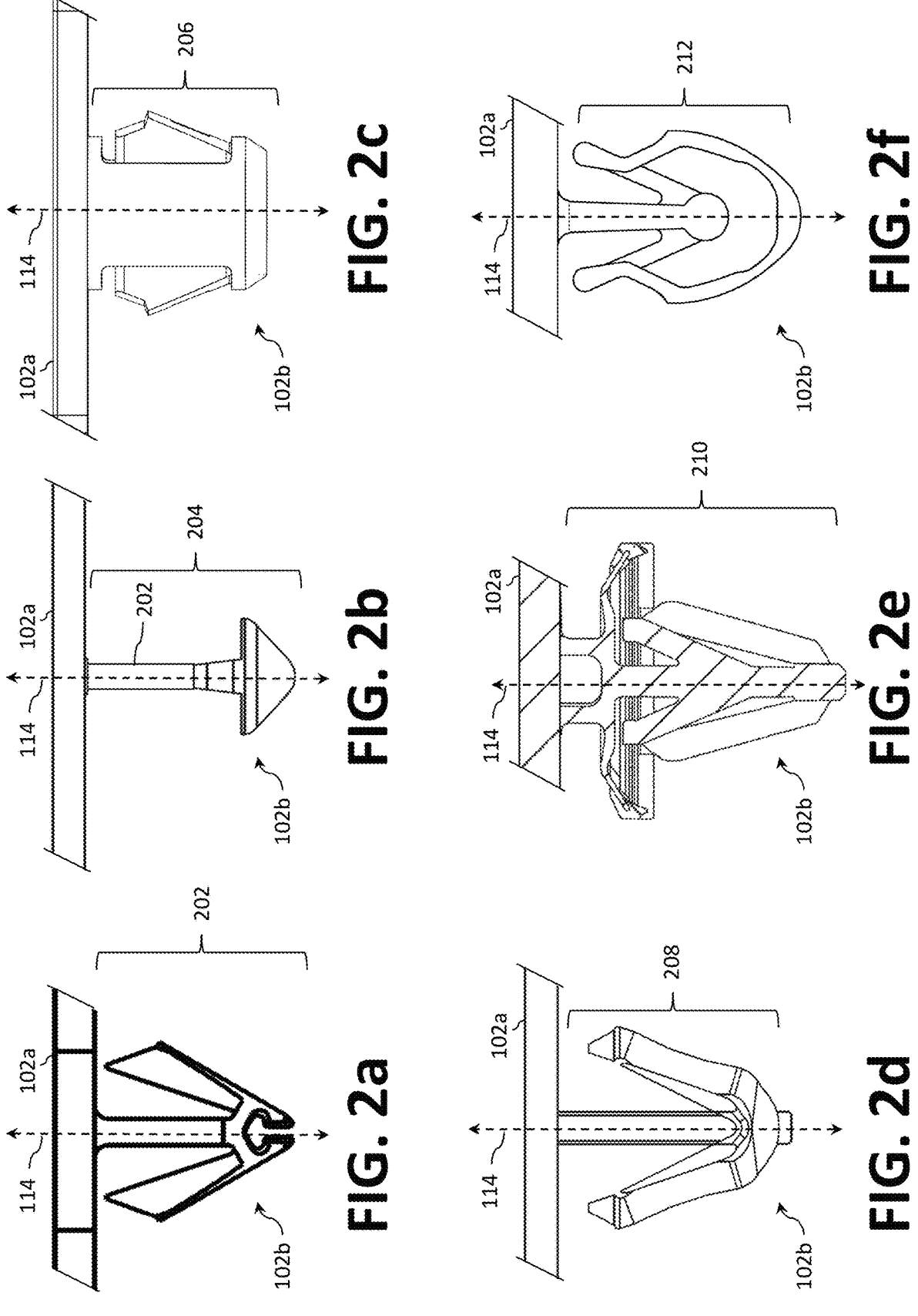
FIGS. 2a through 2f illustrate additional fastener styles suitable for coupling the carrier portion with the component in accordance with other aspects of this disclosure.

While the fastener portion 102b is illustrated as a push-pin fastener, other fastener designs are contemplated. For example, FIGS. 2a through 2f illustrate additional fastener styles that can be used as the fastener portions 102b suitable for coupling the carrier portion 102a with the component 104. Specifically, FIGS. 2a through 2f illustrate, respectively, a W-shaped clip fastener 202 (illustrated as a 2-legged clip fastener), pin fastener 204, a box-prong fastener 206 (illustrated as a 2-legged box-prong fastener), a specialty clip assembly 208 (e.g., a CenterLok™ fastener, which is available from Deltar), a clip assembly with four retaining legs 210, and an clip assembly with two snap-engaging seats 212. The clip assembly with four retaining legs 210, which is illustrated in FIG. 2e as a cross sectional view, is further described in connection with commonly-owned U.S. Pat. No. 10,385,901 to Jeffrey J. Steltz. The clip assembly with two snap-engaging seats 212 of FIG. 2f is further described in connection with commonly-owned U.S. Pat. No. 10,018,214 to Fulvio Pacifico Yon.

FIGS. 3a through 3i illustrate the example fastener 102 of FIGS. 1a and 1b in greater detail. FIG. 3a illustrates a topside isometric view of the fastener 102, while FIG. 3b illustrates an underside isometric view thereof. FIGS. 3c and 3d illustrate, respectively, top plan and bottom plan views of the fastener 102. FIGS. 3e and 3f illustrate, respectively, front and side elevation views of the fastener 102. FIG. 3g illustrated a topside isometric view of the fastener taken along cut line A-A of FIG. 3c. As described above, the fastener 102 is configured to receive one or more tubes 110 via the carrier portion 102a and to engage the component 104 via the fastener portion 102b and the opening 106.

As illustrated, the carrier portion 102a provides the plurality of pockets 112 and a plurality of retention fingers 302. Each of the plurality of pockets 112 defines a central axis 306 that is perpendicular to the central longitudinal axis 114. When a tube 110 is inserted into the tube pocket 112, the length of the tube 110 aligns and/or is parallel to the central axis 306. In some examples, the fastener 102 comprises one or more windows 304 (e.g., cut outs or openings) formed in or on body 300 the carrier portion 102a and/or fastener portion 102b. For example, the body of the carrier portion 102a may be formed with one or more windows 304 that serve to reduce the amount of material needed to fabricate the fastener 102, thus reducing material cost and part weight.

As illustrated, each of the plurality of pockets 112 is positioned between a set of retention fingers 302, which serve to prevent the tube 110 from exiting the tube pocket 112. For example, the retention fingers 302 impart a force on the tube 110 in the direction indicated by arrow 116 to maintain the tube 110 in the tube pocket 112 (e.g., pressing the tube 110 into the tube pocket 112).

In some examples, the retention fingers 302 can be embodied as "rabbit ears." In the illustrated example, each of the retention fingers 302 comprises an arm portion 302a and one or more wings 302b. Each of the tube pockets 112 is separated from adjacent tube pockets 112 by an arm portion 302a. The one or more wings 302b are resiliently coupled to a distal end of the arm portion 302a and configured to deflect as indicated by arrow 308 as the tube 110 is passed into the tube pocket 112. The one or more wings 302b are relatively rigid towards forces that oppose the direction indicated by the arrow 308 and, as such, will lock the tube 110 into the tube pocket 112. A foot 302c is formed or located at an end of the wing 302b and configured to contact the tube 110. The foot 302c may be rounded or otherwise shaped (e.g., blunt) to mitigate damage to the tube 110.

The installation indicator 126 is coupled to the tab 128. The installation indicator 126 can be printed on the tab 128 directly, applied as a sticker, or otherwise. As illustrated, the tab 128 is coupled to the carrier portion 102a via a hinge 128b. The tab 128 is configured to pivot between a first position and a second position when the tube 110 (or another other object) is inserted into the tube pocket 112 of the carrier portion 102a. Specifically, the tab 128 assumes the second position when the object is properly seated into the tube pocket 112 of the carrier portion 102a. The reader 122, which is separate from the fastener 102 and operatively coupled to a computer, is configured, via the processor 124a, to track the installation indicator 126 during installation of the tube 110 or the fastener 102.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A fastener for securing at least one object relative to a component, the fastener comprising:
   a carrier portion configured to secure the at least one object;
   a fastener portion defining a central longitudinal axis, wherein the fastener portion is configured to engage the component; and
   an installation indicator positioned in or on the carrier portion, wherein the installation indicator comprises a 2-dimensional fiducial marker.

2. The fastener of claim 1, wherein the carrier portion and the fastener portion are fabricated as a unitary structure.

3. The fastener of claim 1, wherein the installation indicator is coupled to the carrier portion via a tab.

4. The fastener of claim 3, wherein the tab is coupled to the carrier portion via a hinge.

5. The fastener of claim 4, wherein the tab is configured to pivot between a first position and a second position when the object is inserted into the carrier portion.

6. The fastener of claim 5, wherein the tab assumes the second position when the object is properly seated into the carrier portion.

7. The fastener of claim 1, wherein the 2-dimensional fiducial marker is a barcode.

8. The fastener of claim 1, wherein the 2-dimensional fiducial marker is a quick response (QR) code.

9. The fastener of claim 1, wherein the carrier portion further comprises at least one retention finger configured to prevent the at least one object from exiting at least one tube pocket.

10. The fastener of claim 9, wherein the at least one retention finger comprises an arm and one or more wings.

11. The fastener of claim 10, wherein each of the one or more wings is resiliently connected to the arm and configured to deflect as the at least one object is passed into the at least one tube pocket.

12. The fastener of claim 10, wherein each of the one or more wings comprises a foot positioned at a distal end thereof.

13. A fastener for securing at least one tube relative to a component, the fastener comprising:
   a carrier portion configured to secure the at least one tube via at least one tube pocket;
   a fastener portion defining a central longitudinal axis, wherein the fastener portion is configured to engage the component via an opening; and
   an installation indicator positioned in or on the carrier portion, wherein the installation indicator comprises a 2-dimensional fiducial marker.

14. The fastener of claim 13, wherein the installation indicator is coupled to a tab that is coupled to the carrier portion via a hinge.

15. The fastener of claim 14, wherein the tab is configured to pivot between a first position and a second position when the tube is inserted into the tube pocket to indicate that the tube is properly seated in the tube pocket.

16. The fastener of claim 13, wherein the 2-dimensional fiducial marker is a barcode or a quick response (QR) code.

* * * * *